United States Patent Office 3,555,158
Patented Jan. 12, 1971

3,555,158
2-TRICHLOROMETHYLBENZTHIAZOLES AS ANTHELMINTICS
Eva Lea Samuel, East Bentleigh, Victoria, and George Holan, Brighton, Victoria, Australia, assignors to Monsanto Chemicals (Australia) Limited, West Footscray, Victoria, Australia, a company of Victoria
No Drawing. Original application Apr. 15, 1965, Ser. No. 448,286. Divided and this application Aug. 22, 1966, Ser. No. 596,027
Claims priority, application Australia, Apr. 23, 1964, 43,608/64
Int. Cl. A01n 9/12, 9/20
U.S. Cl. 424—270                3 Claims

ABSTRACT OF THE DISCLOSURE

An anthelmintic composition and method of combating helminthiasis with said composition comprising administering a therapeutic amount of a 2-trichloromethylbenzthiazole having the formula:

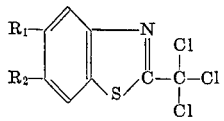

wherein $R_1$ and $R_2$ are selected from the group consisting of hydrogen, chlorine, bromine, alkyl, alkoxy, alkylthio, nitro, amino, acylamino, alkylamino, and dialkylamino, wherein the alkyl and acyl moieties contain less than 9 carbon atoms.

---

This application is a division of application Ser. No. 448,286, filed Apr. 15, 1965, which is now abandoned.

This invention provides new 2-substituted benzthiazoles which have been shown to be useful as biological toxicants especially as anthelmintics, said compounds also being useful as intermediates or starting materials for the preparation of other 2-substituted benzthiazoles which have similarly useful properties.

The new compounds of the invention are the 2-trichloromethyl benzthiazoles having the structural formula:

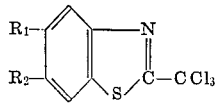

wherein $R_1$ and $R_2$ denote hydrogen or a substituent/s selected from halogen, hydroxy, alkyl, alkoxy, alkylthio, haloalkyl, nitro, amino, and substituted amino groups including acylamino, alkylamino, and dialkylamino. The halogen substituent/s or halo portion of the haloalkyl substituent/s is preferably chlorine; the alkyl group or the alkyl portion of the alkoxy, alkylthio, haloalkyl, alkylamino, or dialkylamino substituent/s may have fewer than 9 carbon atoms and conveniently have less than five carbon atoms, and preferably are methyl.

Compounds in accordance with the invention can be prepared in high yield by the reaction of trichloroacetonitrile with an acid addition salt of the appropriate o-aminothiophenol, as illustrated below:

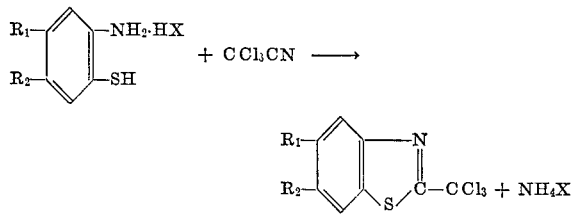

wherein $R_1$ and $R_2$ are as defined above, and X is an anion selected from $Cl^-$, $Br^-$, $SO_4^{--}$ and $H_2PO_4^-$. The two components are mixed together, conveniently in a suitable solvent or diluent. Suitable solvents are ethers, such as dioxan, diethyl ether, 1,2-dimethoxyethane; esters, such as ethyl acetate; and alcohols, such as anhydrous methanol or ethanol. The preferred procedure is to add the trichloroacetonitrile gradually to a solution or suspension of the aminothiophenol salt. The temperature and duration of the reaction vary appreciably with the nature of the $R_1$ and $R_2$ groups. Electron-donating groups such as alkyl and alkoxy favour the reaction, which thus in this case occurs rapidly at room temperature; on the other hand, electron-attracting groups such as halogen and nitro retard the reaction, which thus in that case requires reaction-promoting conditions. In the case where electron-attracting groups are to be present, it therefore often preferable to prepare compounds of such class by carrying out a substitution reaction such as chlorination or nitration on 2-trichloromethylbenzthiazole itself. In all cases the desired product is isolated and separated from the accompanying ammonium salt by conventional means.

Illustrative of the compounds embraced by the structural formula specified above are:

2-trichloromethylbenthiazole;
2-trichloromethyl-5-methylbenzthiazole;
2-trichloromethyl-5,6-dimethylbenzthiazole;
2-trichloromethyl-5-methoxybenzthiazole;
2-trichloromethyl-5-chlorobenzthiazole;
2-trichloromethyl-5-bromobenzthiazole;
2-trichloro-5,6-dichlorobenzthiazole;
2-trichloromethyl-5-methylthiobenzthiazole;
2-trichloromethyl-5-chloromethylbenzthiazole;
2-trichloromethyl-5-nitrobenzthiazole;
2-trichloromethyl-5-aminobenzthiazole;
2-trichloromethyl-5-acetylaminobenzthiazole;
2-trichloromethyl-5-methylaminobenzthiazole; and
2-trichloromethyl-5-dimethylaminobenzthiazole.

Preparation of the new compounds of the invention, utilizing the preferred method described above, is illustrated in the following non-limitative practical examples.

EXAMPLE 1

Trichloroacetonitrile (0.01 mole) was added to a solution of o-aminothiophenol hydrochloride (0.01 mole) in dry ethanol at room temperature. A mildly exothermic reaction occurred and ammonium chloride was precipitated. Dilution with water precipitated a low-melting solid which was recrystallised from methanol to give 2-trichloromethylbenzthiazole as a colourless solid, M.P. 33° C. (65% yield).

Analysis of the product resulted. Found (percent): C, 38.2; H, 1.8; N, 5.0; S, 12.6; Cl, 42.4; $C_8H_4NSCl_3$. Requires (percent): C, 38.1; H, 1.6; N, 5.5; S, 12.7; Cl, 42.2.

EXAMPLE 2

Trichloroacetonitrile (0.01 mole) was added to a solution of 2-amino-4-chlorobenzenethio hydrochloride in absolute ethanol (50 ml.) at room temperature. A mildly exothermic reaction ensued, and the temperature rose to 60° C. After 30 minutes, the solution was diluted with water, giving 5-chloro-2-trichloromethylbenzthiazole as an off-white solid in 98% yield. This crystallised from methanol in colourless plates, M.P. 102° C.

Compounds in accordance with the invention are useful as raw materials or starting materials for the preparation of a wide range of 2-substituted benzthiazoles having various technical applications, including the treatment of helminthiasis, i.e. the treatment of animals susceptible to or suffering from an infestation of the gastro-intestinal tract with parasitic worms, by administering to the animals a prophylactic or a therapeutic amount of at least one such compound. The chlorine atoms of the trichloro group in said compounds of the invention are highly reactive, hence replacement reactions to give other 2-substituted benzthiazoles as indicated, readily occur.

In addition, the compounds of the invention are themselves useful in combatting helminthiasis as indicated above, said compounds combining a useful activity in combatting the parasitic worms whilst having a low toxicity towards the host animals, and moreover, are relatively economical to manufacture. The anthelmintic activity of said compounds was assessed by the modified McMaster egg counting technique as described by H. B. Whitlock and H. McL. Gordon; J. Council Scientific Industrial Research (Australia) 12: p. 50, 1939 and H. B. Whitlock, J. Council Scientific Industrial Research (Australia) 21: p. 177, 1948. Thus, lambs 4–5 months old were infested with larvae of haemonchus contortus. The faeces of the lambs infected were examined at intervals for eggs of haemonchus contortus to ensure that the infestation had been effective. The lambs were then dosed with the test compounds at rates of 100 mg./kg. of body weight and 150 mg./kg. of body weight, two lambs being included in each treatment group. Anthelmintic efficiency was assessed by determining the number of eggs per gram in faeces passed on each of the seven days following treatment. A 100% reduction in egg count was found at both rates specified, indicating a high anthelmintic efficiency.

Veterinary anthelmintic formulations embodying the new compounds of the invention for treatment of helminthiasis can be either as a liquid suspension ready to use, or, as a wettable or water-dispersible powder which is mixed with water prior to use. A liquid-suspension formultion may contain from 50–55% w./v. of the active compound together with a dispersing agent and stabilizing agent. A typical formulation is as follows:

Active compound—50–55 parts weight
Dispersing agent—½–2 parts weight
Stabilising agent—1–3 parts weight
Preservative—As required
Water—Sufficient to make 100 volumes Suitable dispersing agents are those containing sulphonate groups, for example, sodium lignin sulphonate or the sulphonated phenol or naphthol formaldehyde polymers. Bentonite may be employed as the stabilising agent, although it is possible to use such protective colloids as carboxy methyl cellulose, sodium alginate and the like. The formulations can be prepared by mixing the active compound/s and water containing dissolved dispersing agents very vigorously by means of suitable mechanical mixing equipment. A wettable or water-dispersible powder formulation may contain about 90–95% w./w. of the active compound together with a wetter agent and dispersing agent. A diluent such as kaolin can also be added if a concentration below about 98% w./w. is required. An anti-foaming agent, and, in some cases, a stabilising agent may be present. A typical formulation is as follows:

| | Parts weight |
|---|---|
| Active compound | 90–95 |
| Wetting agent | ½–4 |
| Stabilising agent | 0–2 |
| Anti-foaming agent | 0.01–1 |
| Water | 0–5 |

Suitable wetting agents are the non-ionic alkylphenol-ethylene oxide adducts, such as an octylphenol or nonylphenol condensed with ten moles of ethylene oxide, or anionic materials such as the synthetic aryl alkyl sulphonates, examples of which are sodium dodecyl benzene sulphonates, or sodium bibutyl naphthalene sulphonate. In general about 1% w./w. wetting agent is required. The anti-foaming agent employed may be either a silicone or such materials as ethyl hexanol, octanol and the like; and the stabilising agent may again be chosen from bentonite or the water-soluble gums. Wettable or water-dispersible powder formulations are prepared by careful and adequate mixing of the active compound with other ingredients with or without the addition of some water using typical powder blending equipment such as ribbon blender. The powder is stirred into water by the user before application in the field.

What is claimed is:

1. The method of preventing or combating helminthiasis which comprises administering to animals susceptible to or suffering from gastro-intestinal tract worm infestation, a therapeutic amount of a 2-trichloromethyl-benzthiazole having the formula:

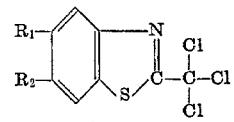

wherein $R_1$ and $R_2$ are selected from the group consisting of hydrogen, chlorine, bromine, alkyl, alkoxy, alkylthio, nitro, amino, acylamino, alkylamino, and dialkylamino, wherein the alkyl and acyl moieties contain less than 9 carbon atoms.

2. A method, according to claim 1, wherein the alkyl and acyl moieties contain less than 5 carbon atoms therein.

3. A method, according to claim 1, wherein the alkyl moieties are methyl and the acyl moieties are acetyl.

References Cited

FOREIGN PATENTS 812,512    4/1957    Great Britain _____ 167—33A

OTHER REFERENCES

Mizuno et al., "Pharm. Soc. of Japan, Journal of," vol. 72, p. 1263–1265 (1952).

ALBERT T. MEYERS, Primary Examiner

V. D. TURNER, Assistant Examiner

U.S. Cl. X.R.

260—304